(12) United States Patent
Grocutt

(10) Patent No.: US 10,073,777 B2
(45) Date of Patent: Sep. 11, 2018

(54) REGION IDENTIFYING OPERATION FOR IDENTIFYING A REGION OF A MEMORY ATTRIBUTE UNIT CORRESPONDING TO A TARGET MEMORY ADDRESS

(71) Applicant: ARM Limited, Cambridge (GB)

(72) Inventor: Thomas Christopher Grocutt, Cambridge (GB)

(73) Assignee: ARM Limited, Cambridge (GB)

( * ) Notice: Subject to any disclaimer, the term of this patent is extended or adjusted under 35 U.S.C. 154(b) by 133 days.

(21) Appl. No.: 14/579,405

(22) Filed: Dec. 22, 2014

(65) Prior Publication Data

US 2015/0227462 A1 Aug. 13, 2015

(30) Foreign Application Priority Data

Feb. 10, 2014 (GB) .................................. 1402241.2

(51) Int. Cl.
  *G06F 12/0813* (2016.01)
  *G06F 12/06* (2006.01)
  *G06F 12/14* (2006.01)

(52) U.S. Cl.
  CPC .......... *G06F 12/0813* (2013.01); *G06F 12/06* (2013.01); *G06F 12/1441* (2013.01); *Y02D 10/13* (2018.01)

(58) Field of Classification Search
  CPC .. G06F 12/0813; G06F 12/06; G06F 12/1441; Y02B 60/1225
  See application file for complete search history.

(56) References Cited

U.S. PATENT DOCUMENTS

| 6,049,897 | A | 4/2000 | Zaidi et al. |
| 7,043,616 | B1 * | 5/2006 | McGrath ............. G06F 9/30101 |
| | | | 711/163 |
| 7,287,140 | B1 | 10/2007 | Asanovic et al. |
| 7,401,358 | B1 * | 7/2008 | Christie ................ G06F 9/4403 |
| | | | 711/163 |
| 7,487,367 | B2 * | 2/2009 | Belnet ................. G06F 12/1491 |
| | | | 711/152 |

FOREIGN PATENT DOCUMENTS

GB 2484997 5/2012

OTHER PUBLICATIONS

GB Search Report for GB Application No. 1402241.2, dated Aug. 4, 2014, 3 pages.

* cited by examiner

*Primary Examiner* — Matthew A Bradley
(74) *Attorney, Agent, or Firm* — Nixon & Vanderhye P.C.

(57) ABSTRACT

A data processing apparatus has a memory attribute unit having storage regions for storing attribute data for controlling access to a corresponding memory address range by processing circuitry. In response to a target memory address, the processing circuitry can perform a region identifying operation to output a region identifying value identifying which of the storage regions of the attribute unit corresponds to the target memory address. The region identifying value is made available to at least some software executed by the data processing apparatus. This can be useful for quickly checking access permissions of a range of addresses or for determining how to update the memory attribute unit.

23 Claims, 10 Drawing Sheets

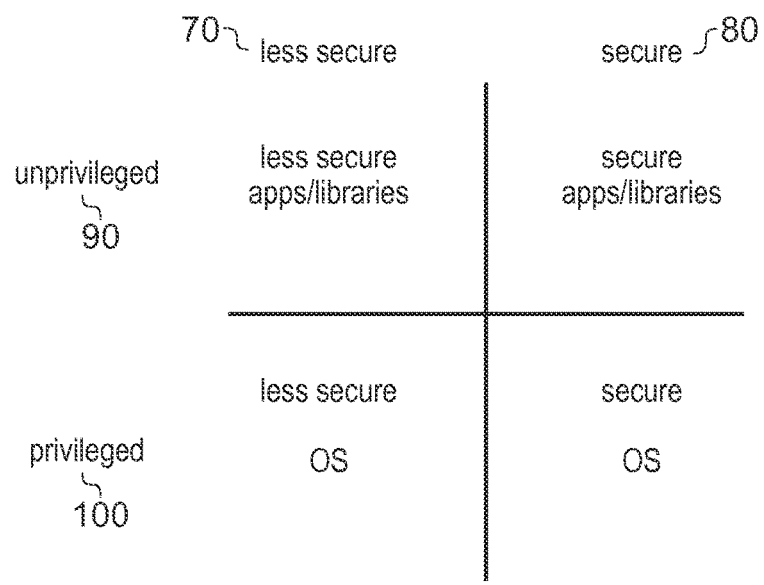

less secure ─╱─70      secure ─╱─80 bob( ADDR[ ], DATA...)     bob( int ADDR[ ], int DATA...)
                           {
                    170 ─< ─ R1 = ADDR [0]
                            ─ R2 = ADDR [N]

180 ─< ─ TT R3, R1
                            ─ TT R4, R1

─ IF (R3[15:8] = R4 [15:8]
                              AND R3[17] = 1 AND R4[17] = 1
                    190 ─ AND R3[22] = 0)
                              THEN BR addr X
                          ELSE                    ╲200
                          (
                            ─ [further checking]
                    210 ─    IF (check failed)
                              THEN HALT / ERROR)
                          add X: ADDR[0] = DATA
                                 ADDR[1] =    ⋮
                                      ⋮
                                 ADDR[N[ =    ⋮
                          }

FIG. 12

REGION IDENTIFYING OPERATION FOR IDENTIFYING A REGION OF A MEMORY ATTRIBUTE UNIT CORRESPONDING TO A TARGET MEMORY ADDRESS

CROSS REFERENCE TO RELATED APPLICATION

This application claims priority to GB Application No. 1402241.2, filed on Feb. 10, 2014, the entire content of which is incorporated herein by reference.

BACKGROUND

The present technique relates to the field of data processing. More particularly, the technique relates to a data processing apparatus having a memory attribute unit for storing attribute data for controlling access to memory.

A data processing apparatus may have a memory attribute unit (such as a memory protection unit) for storing attribute data for controlling access to a corresponding memory address range by processing circuitry. When a memory access is required, then the memory attribute unit looks up attribute data corresponding to an address range including the target address, and if there is a hit, then it is determined based on the attribute data whether a read or write access is permitted.

SUMMARY

Viewed from one aspect, the present technique provides a data processing apparatus comprising:
processing circuitry configured to perform data processing; and
a memory attribute unit comprising a plurality of storage regions, each storage region configured to store attribute data for controlling access to a corresponding memory address range by the processing circuitry;
wherein in response to a target memory address, the processing circuitry is configured to perform a region identifying operation to output a region identifying value for identifying which of said plurality of storage regions is a corresponding storage region indicated by the memory attribute unit as corresponding to a memory address range including said target memory address, wherein the target memory address is a physical address and the region identifying value is made available to at least some software executed by the data processing apparatus.

Viewed from another aspect, the present technique provides a data processing apparatus comprising:
processing means for performing data processing; and
memory attribute storage means comprising a plurality of storage region means for storing attribute data for controlling access to a corresponding memory address range by the processing means;
wherein in response to a target memory address, the processing means is configured to perform a region identifying operation to output a region identifying value for identifying which of said plurality of storage region means is a corresponding storage region means indicated by the memory attribute storage means as corresponding to a memory address range including said target memory address, wherein the target memory address is a physical address and the region identifying value is made available to at least some software executed by the data processing apparatus.

Viewed from a further aspect, the present technique provides a data processing method for a data processing apparatus comprising a memory attribute unit comprising a plurality of storage regions, each storage region configured to store attribute data for controlling access to a corresponding memory address range by processing circuitry; the method comprising:
in response to a target memory address, performing a region identifying operation;
the region identifying operation comprising:
determining which of said plurality of storage regions is a corresponding storage region indicated by the memory attribute unit as corresponding to a memory address range including said target memory address; and
outputting a region identifying value identifying which of said plurality of regions is said corresponding storage region, wherein the target memory address is a physical address and the region identifying value is made available to at least some software executed by the data processing apparatus.

Further aspects, features and advantages of the present technique will be apparent from the following description of examples, which is to be read in conjunction with the accompanying drawings.

BRIEF DESCRIPTION OF THE DRAWINGS

FIG. 5 illustrates an example of different security states of the processing apparatus shown in FIG. 3;

FIG. 6 shows an example encoding of a region identifying instruction;

FIG. 7 shows an example result of the region identifying instruction;

FIG. 12 shows an example of using the region identifying operation to check that the function in the secure domain can be performed securely;

DESCRIPTION OF EXAMPLE EMBODIMENTS

Figure 1:
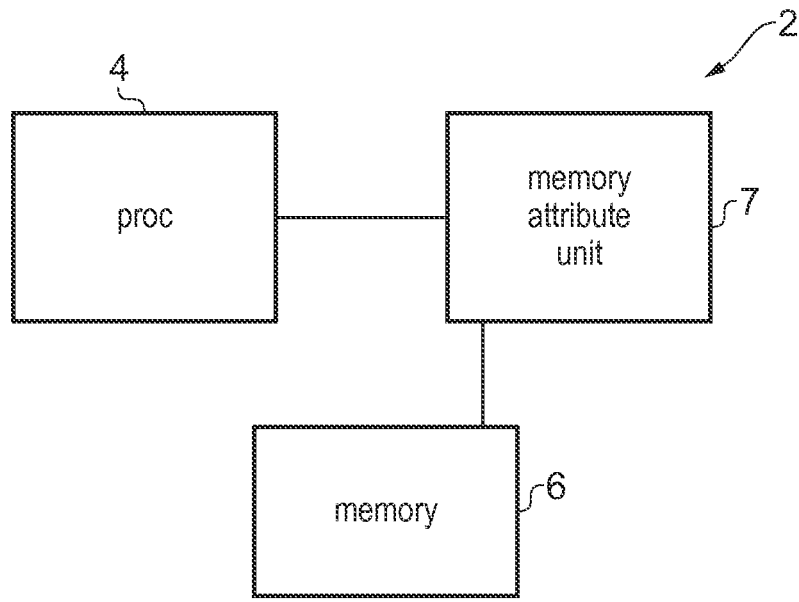
FIG. 1 schematically illustrates an example of a data processing apparatus.

The present technique recognises that there are situations in which it can be useful for the processing circuitry to perform a region identifying operation to output a region identifying value identifying which of the storage regions of the memory attribute unit corresponds to a specified target address, so as to make the region identifying value available to at least some software executed by the data processing apparatus. This is unusual since typically only the attribute data itself would be obtained when looking up a target memory address in the memory attribute unit. Which storage region maps to a particular target address would not normally be considered of interest since the attribute data for a given address could be placed in any of the storage regions. However, the present technique recognises that the region identifying operation can help speed up checking access permissions for a range of addresses, for example. Without the region identifying operation, checking that access to the entire range of addresses is permitted would require the permissions to be checked for each individual address in the range. However, by making the region identifying value available to software, it is possible to check which storage region is associated with the start and end addresses of the range to see whether they both relate to the same storage region. If so, then the access permissions for the entire range of addresses are the same, and so it is not necessary to check the permissions for each individual address, hence increasing performance and reducing power consumption. Even if the start and end addresses are not the same, the region identifying operation can be used to determine the point at which the access permissions change, so as to reduce the number of checks. As shall be discussed below, the region identifying operation can also help when updating the memory attribute unit to bring in attributes for a new context, process or library.

The target memory address is a physical address, which means that the memory attribute unit maps consecutive target memory addresses to consecutive memory addresses at the boundary between the processing circuitry and the memory (in other words, consecutive target memory addresses map to consecutive addresses as output to the memory). In many cases, the addresses output to the memory may be the same addresses as the corresponding target addresses. However, it is also possible for the memory attribute unit to apply a simple mapping such as adding a constant to all target addresses received from the processing circuitry to produce the address output to the memory, and this case is also considered to use a physical target address. This contrasts with a memory management unit, which provides an arbitrary address translation from virtual target addresses as specified by the processor to physical addresses output to memory. In the memory management unit, consecutive target addresses can be mapped to non-consecutive addresses output to memory. The region identifying operation of the present technique is not so useful for a memory management unit, because the address translation is usually implemented at the granularity of pages of memory addresses, which tend to be relatively small (e.g. 4K addresses), and so a single process or program may use addresses corresponding to many different pages. This means that it is much less likely that the region identifying operation can be used to reduce the amount of checking required as discussed above, since often the start and end addresses will correspond to different pages of the memory management unit even if they relate to the same process. In contrast, with a memory attribute unit using a physical address as the target address, the address ranges corresponding to a single storage region of the memory attribute unit tend to be much larger than for the memory management unit, and often the entirety of an address range used by a single program will correspond to a single storage region. Therefore, it is much more likely that the region identifying operation finds that the start and end addresses are associated with the same storage region, allowing a reduction in checking as discussed above.

The region identifying operation can be triggered in different ways. For example, a dedicated region identifying instruction may be provided which specifies the target memory address. The programmer can include the region identifying instruction in code to trigger the processing circuitry to perform the region identifying operation and output the region identifying value.

Alternatively, there may not be a dedicated region identifying instruction. Instead, a predetermined register may be provided which, when written to with a target memory address, triggers the processing circuitry to perform the region identifying operation to identify the region associated with the target memory address. For example, a general purpose store or move instruction may be used to write the target memory address to the predetermined register.

The region identifying operation need not always return a valid region identifying value. There may be various situations in which an invalid region identifying value may be output. For example, an invalid region identifying value may be output if:
(a) the memory attribute unit is disabled; or
(b) the target memory address does not correspond to any of the plurality of regions; or
(c) the target memory address corresponds to two or more of the plurality of regions;
(d) the target memory address corresponds to two or more of the plurality of regions which are enabled; or
(e) the target memory address does not correspond to any of the plurality of regions which are enabled; or
(f) the region identifying operation is performed when the processing circuitry is in a mode of operation having insufficient security privileges to determine the region identifying value.
A given data processing apparatus need not apply all of these criteria and may apply any one or more of these criteria to detect whether an invalid region identifying value should be output.

The invalid region identifying value may be represented in different ways. In one example, the invalid region identifying value may be represented using a predetermined value which does not represent a real storage region of the memory attribute unit. For example, if the storage regions of the memory attribute unit are represented using numbers between 0 and a positive integer, then a negative value (e.g. −1) could be used to indicate an invalid region identifying value. Alternatively, the invalid region identifying value may be represented using an invalid flag which is output along with the region identifying value and is set to a value indicating that the associated region identifying value is invalid. In this case, then the region identifying value may have a value (e.g. zero) which would otherwise signal a real region of the memory attribute unit, but which is indicated by the invalid flag as not representing a valid region.

Regarding case (f) above, in some situations it may not be desirable for the storage region associated with a given address to become available to the user or a program, and so if the region identifying operation is performed when in a state with insufficient security privileges for determining the region identifying value, then an invalid region identifying value may be output. In the case where the invalid value is represented using the invalid flag output along with the region identifying value, it can be useful to set the corresponding region identifying value to a predetermined value (e.g. zero) to prevent a process with insufficient security privileges gaining information from the region identifying value. For example, in a system having a secure state and a less secure state, it may be desirable to prevent code in the less secure state accessing information about the storage regions of a memory attribute unit used in the secure state, as an attacker could use this information to determine information about the address map used by the secure state, which could be used to assist with an attack. By preventing a valid region identifying value being returned in the less secure state, security can be maintained.

As well as the region identifying value, the processing circuitry may also output additional information when performing the region identifying operation. For example, this additional information may comprise any one or more of:
at least some of the attribute data stored in the corresponding storage region,
information derived from at least some of the attribute data stored in the corresponding storage region,
an indication of a security state which is associated with a memory address range for the corresponding storage region, or
values corresponding to the start and/or end addresses of the memory address range for the corresponding storage region.

In situations where the region identifying operation is performed, it is often also necessary to check additional information about the target address, such as the attribute data or security status for this address, and so by outputting this additional information in response to the region identifying operation, this removes the need to perform a separate operation to check the additional information. The hardware of the memory attribute unit may in any case return the additional information in response to a lookup, and so little modification to the hardware may be required in order to extend the region identifying operation to output the additional information.

In the case of the start and/or end address of the memory address range, the additional information need not represent these start or end addresses explicitly. Any value which can be used to derive the start or end address can be used. For example, instead of the address value itself, the addresses could be represented using a multiple of a power of two if the memory address ranges for which attributes are defined have to be aligned with power of two address boundaries. Also, the end address may be represented using a value representing the offset of the end address relative to the start address or the total size of the address range, and similarly the offset may also be represented as a power of two.

The region identifying value output by the region identifying operation may be written to at least a portion of a destination register by the processing circuitry. Hence, the region identifying value may become available for use by a subsequent instruction. The destination register may be specified by the region identifying instruction mentioned above, or could be a default register to which the processing circuitry should write the region identifying value. As well as the region identifying value, other parameters such as the invalid flag or the additional information described above may also be written to the destination register.

The region identifying value may be represented in different ways. In one example, the region identifying value may comprise a region number of the corresponding storage region. The region number may be generated in different ways. In one example, the memory attribute unit may generate the region number in response to the lookup for the target address. For performing normal memory attribute lookups to find the attribute data for a given address, the memory attribute unit typically would have comparators for comparing the target address against the address range for each region, and so the hit signals produced by these comparators may be used to derive the region number. Alternatively, each storage region may store the region number identifying that region. In this case, when the region identifying operation is performed, the processing circuitry may control the memory attribute unit to obtain the region number from the corresponding storage region and the processing circuitry then outputs the region number.

The region identifying value could also be another parameter which indicates the storage region associated with a given address. For example, if the memory address ranges corresponding to different regions of the memory attribute unit do not overlap, then the start address or the end address of each memory address range, as seen by the processing circuitry can identify the storage region storing the attribute data for that range.

The memory attribute unit may comprise any unit which stores attribute data which controls the processing circuitry's ability to perform a memory access for a given memory address. For example, the memory attribute unit may be used to enforce the boundary between more secure and less secure states, or to set certain address ranges as inaccessible to certain software (e.g. application software may not be allowed to access address ranges associated with an operating system or hypervisor).

In some cases there may be more than one type of memory attribute unit within the processing apparatus. If so, then it may be required to identify which region within a first memory attribute unit corresponds to a target address and which region within a second memory attribute unit corresponds to the target address. To speed up this type of operation, the region identifying operation may output both a first identifying value corresponding to the first memory attribute unit and a second region identifying value corresponding to the second memory attribute unit. For example, a single region identifying instruction may return two (or more) different region identifying values so that it is not necessary to execute two separate instructions, speeding up processing.

In the case where the region identifying operation identifies the corresponding regions of two or more memory attribute units, it can be very useful for the region identifying operation to also determine a combined attribute parameter using at least part of the first attribute data stored in the corresponding first storage region of a first memory attribute unit and at least part of the second attribute data stored in the corresponding second storage region of a second memory attribute unit. For example, the first and second memory attribute units may set different conditions for accessing a given memory address, and so to determine whether an access is allowed it may be necessary to consider attribute data in both memory attribute units. By deriving the combined attribute parameter using the attribute data from the respective memory attribute units as part of the region identifying operation, this can reduce the number of instructions required for checking whether the memory access is allowed. For example, in some instruction sets, there are instructions which can relatively easily check whether a single bit within a register has a required value, but checking whether two or more bits have required values may be more complex and require several instructions. The region identifying operation can be used to reduce two or more pieces of information from the first and second memory attribute units to a single bit so that the access permissions in both units can be checked quickly and efficiently using fewer instructions.

The present technique is particularly useful in a system with processing circuitry which has multiple domains of operation including at least a secure domain and a less secure domain. When the processing circuitry is operating in the secure domain, the processing circuitry has access to at least some data which is inaccessible when the processing circuitry is operating in the less secure domain. The memory attribute unit can be used to determine which addresses are accessible only in the secure domain and which addresses are accessible in both the secure domain and the less secure domain. By using the region identifying operation it can quickly be checked whether a range of addresses all relate to the same storage region, avoiding the need to individually check access attributes for each address, and hence speeding up processing and reducing power consumption.

The secure domain and less secure domain may have various forms. In one example the secure domain may correspond to a privileged state in which privileged code, such as operating systems offer, can be executed and the less secure domain can correspond to an unprivileged state in which unprivileged code such as application software is executed. However, in other systems there may be a complete partitioning between two or more "worlds" running on the same device with the secure domain corresponding to a private domain for executing security critical code such as banking applications or safety critical code, and the less secure domain corresponding to a public domain for executing non-security critical code. In some embodiments the private and public domains may not have sub-states within that domain, such as the unprivileged and privileged states described above. In general, for any boundary between a more secure and a less secure state, the memory attribute unit can be used to enforce the boundary, and the present technique can be useful for checking which region of the memory attribute unit belongs to a given target address, so that if a pair of addresses relate to the same region then it can be determined that any intervening addresses will also have the same attribute data.

In one example, the memory attribute unit may comprise a security protection unit which is used to determine which of the plurality of domains is associated with a specified memory address. The security protection unit may be implemented in different ways. It is possible to store attribute data including a security flag specifying whether the corresponding address range relates to the secure domain or the less secure domain. Alternatively, for at least one of the domains the address ranges associated with that domain may be identified implicitly in the security protection unit, by assuming that any address range for which there is no attribute data in the security protection unit is associated with that domain. Hence, it is not necessary to store attribute data in the security protection unit for all addresses in the address space. For example, the security protection unit may include data defining address ranges corresponding to the secure domain, and if a target address misses in the security protection unit, then it may be assumed that it is associated with the less secure domain (or vice versa). If there are more than two domains then address ranges associated with all but one of the domains may be indicated in the security protection unit and addresses which miss in the security protection unit can be assumed to correspond to the remaining domain.

In some embodiments, the security protection unit may also be used to determine whether to operate in the secure domain or the less secure domain in the first place, for example assuming that an instruction stored in a secure address range should be executed in the secure domain and an instruction stored in a less secure address range should be executed in the less secure domain. In some examples, the security protection unit need not define any other access permissions other than the secure or less secure state associated with the address range.

It may not be desirable to allow code executing in the less secure domain to determine which regions of the security protection unit correspond to which addresses. An attacker may be able to use this information to cause a security violation. To address this, the processing circuitry may prevent the region identifying operation being executed successfully when the processing circuitry is operating in the less secure domain. In general, the processing circuitry may inhibit outputting of the region identifying value for the security protection unit if the region identifying operation is executed while in the less secure domain. This may be achieved in different ways. For example, the processing circuitry may output an invalid region identifying value as discussed above, or an error or fault may be triggered if the region identifying operation is attempted while in the less secure domain. Even if the region identifying value associated with the security protection unit is not output, a region identifying value for another memory attribute unit may still be output if this is permitted for the current state of the data processing apparatus.

Another form of memory attribute unit is a memory protection unit (MPU) which stores attribute data such as read or write permissions for controlling access to memory address ranges. In systems which comprise a MPU and the secure and less secure domains as discussed above, then multiple MPUs may be provided corresponding to different domains. For example, a secure MPU may store attribute data used for controlling access to address ranges when operating in the secure domain and a corresponding less secure MPU can be used when operating in the less secure domain, and less secure code can be prevented from accessing the secure MPU. While in some embodiments the secure and less secure MPUs may be entirely separate, it is also possible for the respective MPUs to share some circuitry. For example, if only one of the secure and less secure MPUs is expected to be active at a time, then while distinct storage areas may be provided for storing the attribute data for these units, a common set of comparators may be shared between the MPUs for comparing a target address with the address ranges defined in each storage region.

Hence, there may be both a security protection unit and one or more MPUs. In one example, the region identifying operation may output both a first region identifying value and a second region identifying value as discussed above, with the first value corresponding to the security protection unit and the second value corresponding to one of the MPUs.

Where there are multiple MPUs, then the region identifying operation may also select which of the MPUs should be used to determine the region identifying value. For example, this can be done by specifying a parameter in the region identifying instruction indicating which of the secure and less secure MPUs should be accessed to determine the corresponding region. Alternatively, in the case where a write to a dedicated register triggers the region identifying operation then the selected MPU may be chosen by the user by placing a flag in the register, or by providing different dedicated registers corresponding to the different MPUs so that the selection of which register is written to with the target address determines which MPU is accessed. In this way, the user can control which of the MPUs is interrogated to determine which region corresponds to the target address.

While in the less secure domain, it may not be appropriate for the user to be able to find out which region of the secure MPU corresponds to a given address. If the region identifying operation attempts to select the secure MPU as the selected MPU while the processor is operating in the less secure domain, then outputting of the region identifying value identifying the storage region of the secure MPU may be inhibited. As discussed above, this may be achieved in different ways such as by outputting an invalid value or signalling an error or fault.

In one example of the method, the region identifying operation may be performed as part of a function executed in the secure domain using one or more memory addresses set by code executing in the less secure domain, and the target memory address for the region identifying operation may be one of the memory addresses passed by the less secure domain. In a case where a function is called by the less secure domain to a target address in the secure domain and one or more addresses used by the function passed from the less secure domain, then there is potential attack where the less secure domain can pass in a secure address and this address is then accessed in the secure domain. Since accesses to secure addresses in the secure domain would normally be allowed, this may provide a security hole in which less secure code can control accesses to secure addresses. However, by executing the region identifying operation in the function in the secure domain, this can check which memory attribute unit region corresponds to the addresses passed by the less secure domain, and if all the addresses passed by the less secure domain correspond to the same region and that region has appropriate access permissions for the less secure domain then the rest of the function can be carried out as normal, with fewer checks than would be required if there was no region identifying operation and instead each address passed by the less secure domain had to be checked individually.

Figure 2:
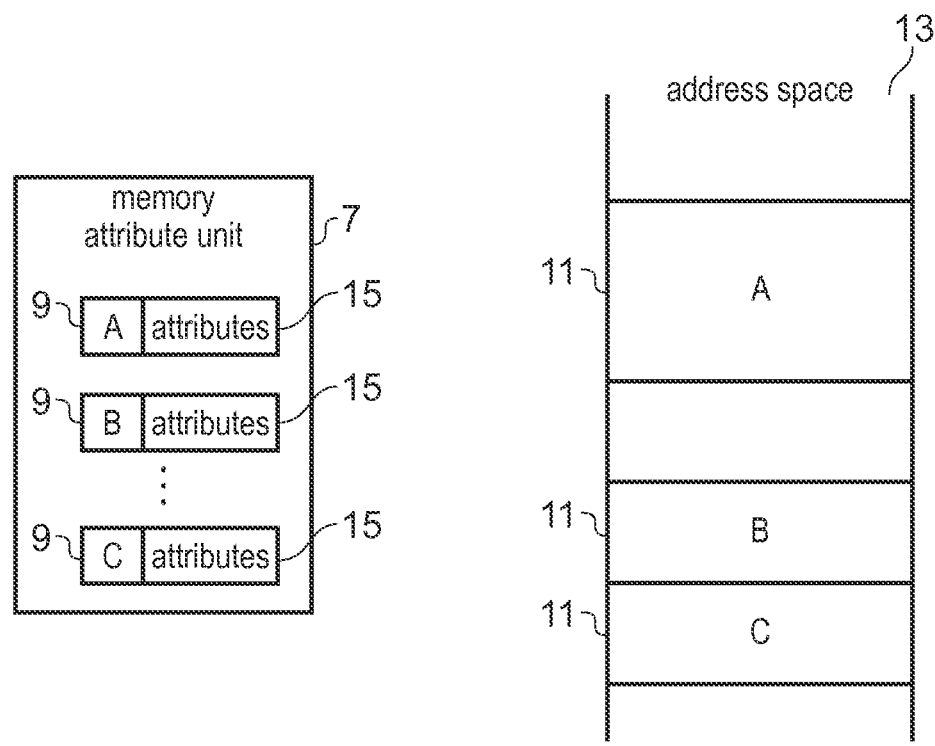
FIG. 2 illustrates a memory attribute unit for storing attribute data for corresponding address ranges of a memory address space.

FIG. 1 schematically illustrates a data processing apparatus having processing circuitry 4, a data store (memory) 6 and a memory attribute unit 7 for storing attribute data for controlling access to the memory 6 by the processing circuitry 4. FIG. 2 shows an example of the memory attribute unit 7 which has several storage regions 9, each storage region 9 for storing attributes data for a corresponding memory address range 11 as indicated in the address space 13 shown in FIG. 2. While the memory 6 is indicated as a single block in FIG. 1, in some cases the memory address space may cover locations in several different devices (e.g. RAMs, flash memory devices, control registers for peripherals, etc.).

The layout of the address space visible to the processing circuitry 4 may be substantively the same as the layout of the address visible to the memory attribute unit 7. Each storage region 9 is configurable by instructions executing on the processing circuitry 4 so as to map to different address ranges in the address space 13. For example a storage region 9 may store parameters defining the corresponding address range, such as a start address and end address of the address range, a start address and parameter indicating the size of the address range, or a value indicating a multiple of a power of two that corresponds to the start of the address range and a size parameter indicating the size of the address range. In other examples, the address range associated with a storage region 9 may be hardwired into the storage region. Hence, there are different ways of representing the address range corresponding to the storage region 9. In some examples, the configuration of the memory attribute unit 7 may not be valid if the address ranges defined for each storage region 9 overlap, while in other examples some overlapping address ranges may be permitted in order to define multiple layers of access permissions for the same address. In some embodiments, the address ranges may be of arbitrary multiples of a given address increment (rather than having to select from a limited number of range sizes), and the lengths of neighbouring address ranges (e.g. B and C) may be set independently of each other (there is no need to constrain the memory attribute unit 7 to define several adjacent address ranges each having the same length).

Each storage region 9 includes one or more attributes 15 which control how the processor 4 can perform a memory access operation to addresses within the corresponding address range. For some embodiments, the addresses or other parameters defining the corresponding address range may be the only attribute data 15 stored by the memory attribute unit 7, with some other information being indicated implicitly by whether or not an address has a corresponding address range defined in the memory attribute unit. For other embodiments, there may be further attribute data 15 in addition to the address range defining data, such as data specifying whether the processor 4 can read and/or write to the location in memory 6 identified by the address, and data identifying which of a plurality of security states or domains is associated with an address. When performing a memory access to a location in memory 6 identified by a target address, the target address is provided to the memory attribute unit 7 which compares the target address with the address ranges defined for each of the storage regions 9, and outputs the attribute data associated with the one of the regions 9 that corresponds to an address range including the target address. The processing circuitry 4 then determines based on the output attribute data whether the access to memory is allowed. The target address provided to the memory attribute unit 7 is a physical address (not a virtual address), such that consecutive target memory addresses as specified by the processing circuitry 4 are mapped by the memory attribute unit 7 to consecutive addresses as output to the memory 6.

Figure 3:
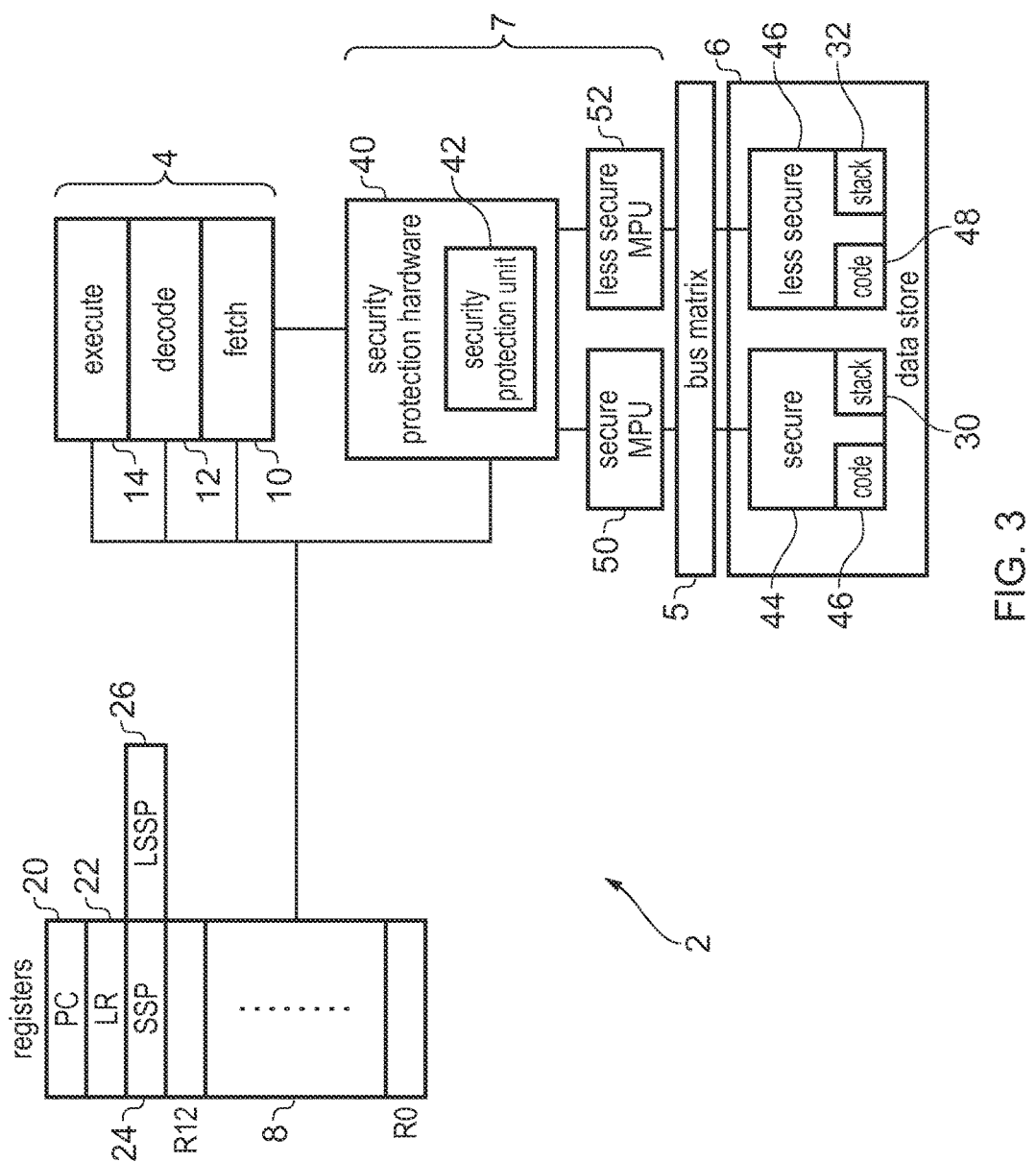
FIG. 3 shows a more detailed example of a data processing apparatus.

FIG. 3 shows an example of the processing apparatus 2 in more detail. The data processing apparatus 2 comprises processing circuitry 4, and a data store 6 as indicated in FIG. 1 and also comprises several units 42, 50, 52 which can each be regarded as an example of the memory attribute unit 7 shown in FIGS. 1 and 2. The data processing apparatus 2 also comprises registers 8 for storing data to be processed by the processing circuitry 4. The data store 6 may include at least one cache as well as main memory. The processing circuitry 4 comprises a processing pipeline which includes a fetch stage 10 for fetching instructions from the data store 6, a decode stage 12 for decoding the fetched instructions, and an execute stage 14 for executing the decoded instructions. It will be appreciated that the pipeline may include other stages, for example a register renaming stage or issue stage.

The registers 8 include several general purpose registers R0 to R12 for storing data on behalf of the processing circuitry 4. While FIG. 3 shows 13 general purpose registers R0 to R12, other numbers of registers may be provided, and optionally floating point registers for storing floating point values could also be provided. The registers 8 also include some special purpose registers including a program counter (PC) register 20, a link register (LR) 22 and stack pointer (SP) registers 24, 26. The program counter register 20 stores a program counter indicating the address of the next program instruction to be executed by the processing circuitry 4. Generally, following execution of an instruction the program counter will be updated to indicate the next instruction from memory. However in response to a control flow altering instruction the program counter can be set to a value which does not point to the next sequential instruction. The link register 22 may store a return value used when returning from a function or an exception to determine which program instruction should be processed following completion of the function or exception. The stack pointer registers 24, 26 store secure and less secure stack pointers respectively, which point to a secure stack 30 and less secure stack 32 in the data store 6. For example, the stack pointers can indicate the location of the last item placed on the stack 30, 32, or can indicate the next location to which a data value placed on the stack 30, 32 should be written.

Security protection hardware 40 is provided to enforce separation between a secure domain and a less secure domain. The security protection hardware has a security protection unit 42 which stores protection data defining whether regions of the data store 6 are a secure region or a less secure region. FIG. 3 shows an example in which the data store 6 has one secure region 44 and one less secure region 46, but in practice the data store 6 may include several regions of each type. In some examples the security protection unit 42 may only include attribute data defining address ranges associated with one of the secure domain and the less secure domain, with address ranges not defined in the security protection unit 42 being assumed to relate to the other of the secure domain and the less secure domain. Code 46 located within the secure region 44 of the data store 6 is executed by the processing circuitry 4 in the secure domain while code 48 located within the less secure region 46 is executed in the less secure domain. When in the less secure domain, the processing circuitry 4 cannot access data or instructions stored in the secure region 44. Transitions between the less secure domain and the secure domain are controlled by the security protection hardware 40 to ensure that only certain allowed transitions are accepted.

The data processing apparatus 2 comprises a secure memory protection unit (MPU) 50 and a less secure MPU 52 for defining access permissions for the secure and less secure regions 44, 46 of the data store 6 respectively. The MPUs 50, 52 access the data store 6 via a bus matrix 5. The access permissions control whether sub-regions of the secure and less secure regions 44, 46 are accessible or inaccessible, so that different access permissions can be set within the secure or less secure regions for different processes or software programs. The regions defined by the secure MPU 50 and less secure MPU 52 may overlap. For example, the secure MPU 50 and less secure MPU 52 may define different attributes for the same memory region.

Figure 4:
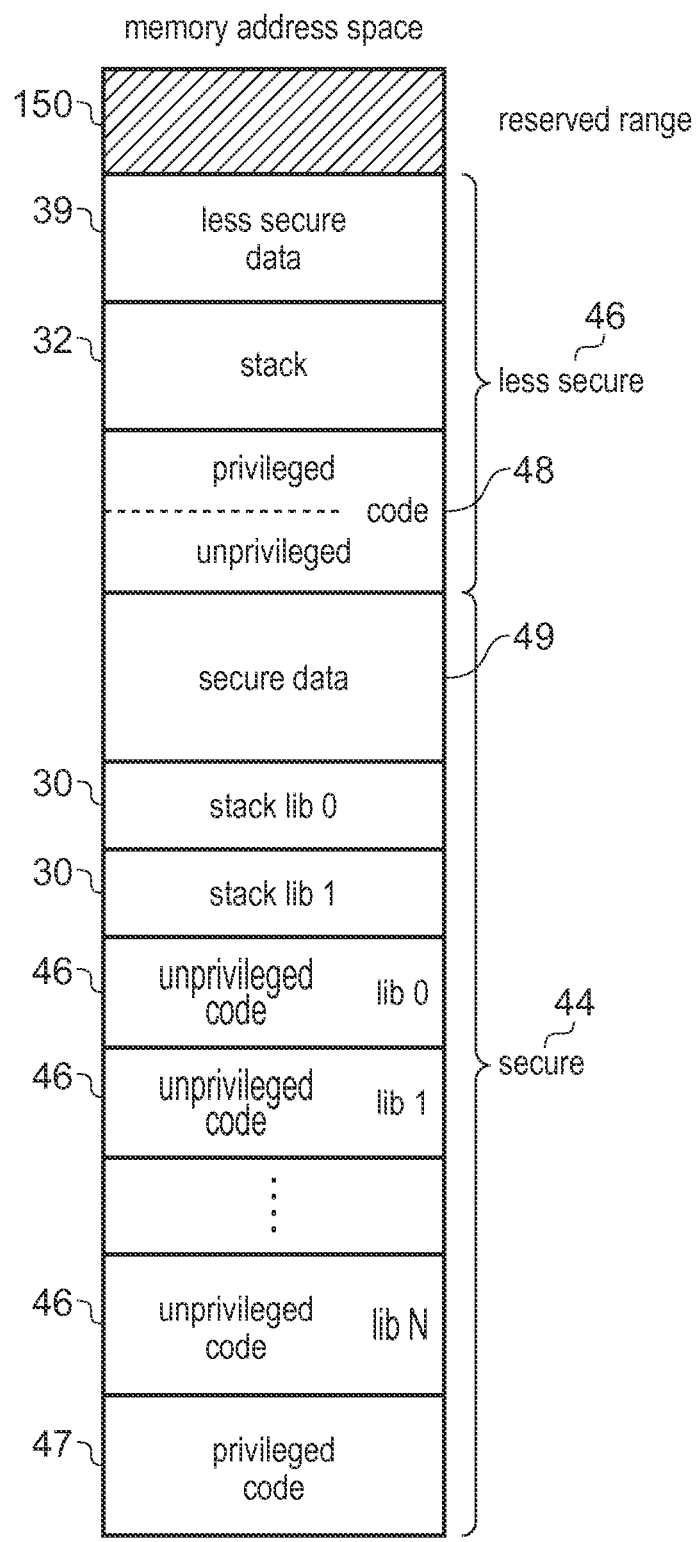
FIG. 4 shows an example of a memory address space used with example of FIG. 3.

FIG. 4 shows an example of the memory address space of the data store 6. The address space has a secure region 44 and a less secure region 46. While FIG. 4 shows one less secure region 44 and one secure region 46, a greater number of non-contiguous secure regions and less secure regions could be provided. The security protection unit 42 stores data defining which regions of the data store 6 are secure regions or less secure regions (one of these can be indicated implicitly by an absence of data defining the address range in the security protection unit 42).

The secure region 44 includes one or more secure stacks 30 corresponding to secure software libraries. The secure region 44 also comprises unprivileged secure code 46 corresponding to application code or application-level software libraries, and privileged secure code 47 corresponding to an operating system for example. The secure MPU 50 controls which sub-regions of the secure regions 44 relate to the unprivileged or privileged mode. Similarly, the less secure region 46 includes less secure code 48 (including privileged and unprivileged code) for executing in the less secure domain, a less secure stack 32 used by the less secure code 48, and less secure data 39. The less secure MPU 52 controls whether data or code in the less secure region 46 is privileged or unprivileged. Typically, unprivileged code cannot access privileged data or code. The memory address space also includes a reserved address range 150 which does not correspond to any valid instruction address. This reserved range can be used for special functions, such as providing dummy addresses which can trigger special events. For example, the reserved address range 150 may comprise addresses in the range 0xF0000000 to 0xFFFFFFFF.

FIG. 5 schematically illustrates different states of the processing apparatus 2. The apparatus has a less secure domain 70 and a secure domain 80, which provide a partitioning of the processing apparatus 2 so that secure processes and operating systems can be executed securely without risk of access by less secure processes and operating systems. Direct function calls and branches can be made between the less secure domain 70 and the secure domain 80, with the security protection hardware 40 policing the boundary between the domains 70, 80 and ensuring that the transition between domains is permitted. The same thread of processing may include processing in both the secure domain 80 and the less secure domain 70. For example, a less-secure application may branch to the secure region to perform a security-critical function such as password checking or payment processing, and then branch back to the less secure region for further processing which is not security critical. When the apparatus 2 is in the less secure domain 70 then the security protection unit 42 ensures that data that is associated with a secure domain 80 is inaccessible.

Within each of the less secure and secure domains 70, 80 there is an unprivileged state 90 and a privileged state 100. In general, the privileged state 100 is used for privileged software such as operating systems while the unprivileged state 90 is used for unprivileged codes such as applications and libraries. Unlike the less secure and secure domains 70, 80, branches or function calls between the unprivileged state 90 and privileged states 100 are generally not possible, and a context switch or exception may be required to switch between the privileged and unprivileged modes. A given thread would usually operate either in the unprivileged state 90 or in the privileged state 100, not both. In general, when in an unprivileged state 90 then data associated with the privilege state 100 is not accessible (although there may be an exception to allow the unprivileged state 90 in the secure domain 80 to access data from the privileged state 100 in the less secure domain 70). The secure MPU 50 defines access permissions which indicate whether address ranges are accessible in the privileged or unprivileged states while the processing apparatus 2 is in the secure domain 80, while the less secure MPU 52 defines access permissions indicating whether address ranges are accessible from the privileged or unprivileged states while the processing apparatus 2 is in the less secure domain 70.

Typically, a memory attribute unit 7 such as the security protection unit 42 or the secure or less secure MPU 50, 52 can be queried using a target address and will then return attribute values for the corresponding target address. However, the present technique recognises that there are some situations in which it is useful to be able to return a region identifier identifying which of the storage regions 9 of the memory attribute unit 7 (42, 50, 52) corresponds to the target address. Hence, the processing circuitry 4 is able to perform a region identifying operation in response to an instruction, in order to identifying the storage region 9 corresponding to a specified target address and output a region identifying value identifying the storage region.

FIG. 6 shows an example of a region identifying instruction for triggering the processing circuitry 4 to perform the region identifying operation. The region identifying instruction TT has an encoding which specifies a source register Rn and a destination register Rd, as well as an optional flag A which will be described later (other embodiments may not use the flag A). The programmer writes the program so that a specified target address is placed in the source register Rn before the region identifying instruction TT is executed. In response to the region identifying instruction, the processing circuitry 4 performs a region identifying operation in which it is determined using the memory attribute unit 7 which of the storage regions 9 corresponds to the target address in the register Rn, and a result value is then written to a destination register Rd which includes a region identifying value which identifies which of the regions 9 corresponds to the address.

FIG. 7 shows an example of the result value written to the destination register Rd. In the example of FIG. 3, since there are two types of memory attribute units 7 (the security protection unit 42 and the MPUs 50, 52), then the region identifying operation returns two different region identifying values: one value MREGION indicating which storage region of the secure or less secure MPU 50, 52 corresponds to the target address, and a second value PREGION indicating which storage region of the security protection unit 42 corresponds to the target address. In general, for the MPUs, the value MREGION may identifying a corresponding storage region in the one of the MPUs 50, 52 that corresponds to the current domain of operation. However, if the "alt" flag A is set, then the MPU 50, 52 from the opposite domain may be looked up (this may only be allowed when operating in the secure domain). In other embodiments which only have one memory attribute unit 7, only one region identifying value may be provided.

In this example, the result value also includes several other pieces of additional information which are determined based on the attribute data of the storage region 9 corresponding to the target address. As the memory attribute unit 7 is already being looked up to identifying the corresponding storage region, it can be efficient to also return additional pieces of attribute data from the corresponding storage region 9 to avoid the need to execute a further instruction in order to determine the attribute data.

In this example, the result value includes the following fields of information:

MREGION (bits [7:0]): The region number of the MPU region that the target address maps to.
PREGION (bits [15:8]): The region number of the security protection unit 42 that the target address maps to.
MRVALID (bit [16]): This field is set to 1 if the MREGION field is valid. The MREGION field will be invalid if any of the following conditions is true:
  The MPU 50, 52 being interrogated is not present or disabled
  The target address matched multiple enabled MPU regions
  The target address did not match a MPU region that was enabled
  The region identifying operation was executed when in an unprivileged mode, and the A flag was not specified (when in the unprivileged state in the secure domain 80, it is not allowed to access information about regions associated with the privileged state in the secure domain 80, but information can be accessed about the privileged and unprivileged regions in the less secure domain 80, which is why the A flag must be specified in order for an unprivileged execution of the region identifying operation in the secure domain to be valid).

Optionally, an invalid MREGION field may be generated if the region identifying operation was executed when in the non-secure domain, and the A flag was specified (when in the non-secure domain, it is not allowed to access information about the secure MPU 50). Alternatively, if the A flag is specified while in the non-secure domain, the instruction may be treated as undefined, in which case the region identifying operation may not be performed at all.

PRVALID (bit [17]): This field is set to 1 if the PREGION field is valid. The PREGION field will be invalid if any of the following conditions are true:
  The security protection unit 42 is disabled
  The target address matched multiple enabled regions in the security protection unit 42
  The target address did not match any enabled regions in the security protection unit
  The region identifying operation was executed while in the non-secure domain (code in the non-secure domain cannot access information about the regions of the security protection unit 42, which could give a clue to which addresses relate to secure data or code).
  The region identifying operation was executed on an apparatus which does not implement the secure/less-secure domain partitioning provided by the security protection hardware 40.

R (bit [18]): Read accessibility. R is set to 1 if the memory location identified by the target address can be read according to the permissions of the selected MPU when operating in the current one of the privileged and unprivileged modes.

RW (bit [19]): Read/write accessibility. RW is set to 1 if the memory location identified by the target address can be read and written to according to the permissions of the selected MPU when operating in the current one of the privileged and unprivileged modes.

NPR (bit [20]): Equal to R AND (NOT P). If set to 1, this indicates that the address can be read and is associated with the less secure domain 70.

NPRW (bit [21]): Equal to RW AND (NOT P). If 1, this indicates that the target address can be read and written and is associated with the less secure domain 70.

P (bit [22]): Privacy. A value of 1 indicates that the memory location is associated with the secure (private) domain 80 while a value of 0 indicates that the memory location is associated with the less secure (public) domain 70. This field is only valid if the region identifying operation was executed while in the secure domain 80.

The parameters NPR and NPRW are derived from some of the attribute data R or RW obtained from the MPU 50 or 52 and some of the attribute data P obtained from the security protection unit 42. By determining this derived parameter as part of the region identifying operation, it is not necessary to execute a further instruction to combine this information. Checking whether a read/write to an address is permitted and whether the address is a less secure address is a relatively common operation in a system having the states shown in FIG. 5. By returning a single bit which indicates both pieces of information, this greatly simplifies further checking, since generally the value of a single bit within a register Rd can be checked efficiently using a single instruction, but checking the values of two or more bits (e.g. the separate bits R and P or RW and P) can be more complex. In other examples, other derived parameters using some of the information from the different attribute units 7 can be obtained.

An example of pseudo code representing the region identifying operation performed in response to the instruction encoding shown in FIG. 6 is shown below (the abbreviation PAU refers to the security protection unit and the terms "private" and "public" refer to the secure and less secure domains respectively):

```
d = UInt(Rd); n = UInt(Rn); alt = A == '1';
if d IN {13, 15} || n == 15 then UNPREDICTABLE;
if alt && !IsPrivate( ) then UNDEFINED;
Operation:
if ConditionPassed( ) then
    EncodingSpecificOperations( );
    addr = R[n];
    //reset destination register
    R[d] <31:23> = (bits(9) UNKNOWN);
    R[d] <22:0> = Zeros(23);
//Only allow privacy checks if we're in the private state
if isPrivate( ) then
        pauattributes = PAUCheck (addr, FALSE);
        if pauattributes.multiRegionHit then
            if HaveMainLineProfile( ) then
                PFSR.PAUVIOL = '1';
                __raise(PrivateFault);
            else
                __raise(HardFault);
        R[d]<15:8> = pauattributes.region;
        R[d]<17>    = if pauattributes.hit then '1' else '0';
        addrPrivate= if pauattributes.np then '0'else '1';
        R[d]<22>    = addrPrivate;
    //MPU region information only available when privileged or //when inspecting
    the other domain's MPU
    if CurrentModeisPrivileged( ) || alt then
        (write, read, region, hit) = IsAccessible(addr, alt ^
            IsPrivate( ));
        R[d]<7:0> = region;
        R[d]<16> = hit;
        R[d]<18> = read;
        R[d]<19> = write;
        if IsPrivate( ) then
            R[d]<20> = read AND NOT addrPrivate;
            R[d]<21> = write AND NOT addrPrivate;
// PAUCheck( )
// ==========
PAUAttributes PAUCheck(bits(32) address, boolean isinstrfetch)
    PAUAttributes result;
    // Setup default attributes
    result.np              = FALSE;
    result.npc             = FALSE;
    result.multiRegionHit  = FALSE;
    result.region          = 0<7:0>;
    result.hit             = FALSE;
    // The 0xFE000000 -> 0xFFFFFFFF is always private for instruction fetches
    if isinstrfetch && (address<31:25> == '1111111') then
        // Use default attribus defined above
    // SCS space except from PAU checking
    elsif address<31:12> == 0xE000E<19:0> then
        // memory privacy reported as current state
        result.np = CurrentState == PrivacyState_Public;
    // If the PAU is enabled check its regions
    elsif PAU_CTRL.ENABLE == '1' then
        boolean foundRegion = FALSE;
        for r = 0 to (UInt(PAU_TYPE.PREGION) - 1)
            if PAU_REGION[r].ENABLE == '1' then
                // PAU_region enabled so perform checks
                bits(32) base_address = PAU_REGICN[r].BADDR:'00000';
                bits(32) limit_address = PAU_REGION[r].LADDR:'11111';
                if ((UInt(base_address) <= UInt(address)) &&
                    (UInt(limit_address) >= UInt(address))) then
                    if foundRegion then
                        result.multiRegionHit    = TRUE;
                        result.np                = boolean UNKNOWN;
                        result.npc               = boolean UNKNOWN;
                        result.hit               = boolean UNKNOWN;
                        result.region            = bits(8) UNKNOWN;
                    else
                        result.np       = PAU_REGION[r].NPC == '0';
                        result.npc      = PAU_REGION[r].NPC == '1';
                        result.hit      = TRUE;
                        result.region   = r<7:0>;
                        foundRegion     = TRUE;
```

```
    return result;
// IsAccessible( )
// ==============
(bit, bit, bits(8), bit) IsAccessible(bits(32) address, boolean isPrivate)
  bit write;
  bit read;
  // Work out which privilege level the current mode in the public state
  // is subject to
  isPrivileged    = (CurrentMode == Mode_Handler) || (if isPrivate then
                      CONTROL_P.nPRIV == '0' else CONTROL_NP.nPRIV == '0');
  (attrib, perms) = MPUCheck(address, AccType_NORMAL, isPrivileged, FALSE);
  case perms.ap of
    when '000' (write, read) = ('0','0');
    when '001' (write, read) = if isPrivileged then ('1','1') else ('0','0');
    when '010' (write, read) = if isPrivileged then ('1','1') else ('0','0');
    when '011' (write, read) = ('1','1') ;
    when '100' UNPREDICTABLE;
    when '101' (write, read) = if isPrivileged then ('0','1') else ('0','0');
    when '110' (write, read) = ('0','1');
    when '111' (write, read) = ('0','1');
  return (write, read, perms.region, perms.hit);
// MPUCheck( )
// ==========
(MemoryAttributes, Permissions) MPUCheck(bits(32) address, AccType acctype, boolean
ispriv, boolean private)
  assert(HaveAPExt( ) || !private);
  MemoryAttributes attributes;
  Permissions perms;
  attributes   = DefaultMemoryAttributes(address);
  perms        = DefaultPermissions(address);
  hit = FALSE; // assume no valid MPU region and not using default memory map
  isPPBaccess = (address<31:20> == '111000000000');
  // Get the MPU registers for the correct privacy domain
  if private then
    mpu_ctrl = MPU_CTRL_P;
    mpu_type = MPU_TYPE_P;
  else
    mpu_ctrl = MPU_CTRL_NP;
    mpu_type = MPU_TYPE_NP;
  // Pre-compute if the execution priority is negative, as this can affect the
  // MPU permissions used. NOTE: If public FAULTMASK is set this is also
  // considered to be a negative priority for the purpose of the public MPU
  // permissions regardless of how public exceptions are prioritised with
  // respect to the private state
  negativePri = ExecutionPriority( ) < 0;
  if HaveAPExt( ) && HaveMainLineProfile( ) then
    negativePri = negativePri || (!private && FAULTMASK_NP.FM == '1');
  // Determine what MPU permissions should apply based on access type and MPU
  // configuration
  if (acctype == AccType_VECTABLE) || isPPBaccess then
    hit = TRUE; // use default map for PPB and vector table lookups
  elsif mpu_ctrl.ENABLE == '0' then
    if mpu_ctrl.HFNMIENA == '1' then UNPREDICTABLE;
    else hit = TRUE; // always use default map if MPU disabled
  elsif mpu_ctrl.HFNMIENA == '0' && negativePri then
    hit = TRUE; // optionally use default for HardFault, NMI and
FAULTMASK.
    else // MPU is enabled so check each individual region
      if (mpu_ctrl.PRIVDEFENA == '1') && ispriv then
      hit = TRUE; // optional default as background for Privileged accesses
    for r = 0 to (UInt(mpu_type.DREGION) − 1) // highest matching region wins
      bits(16) size_enable;
      bits(32) base_address;
      bits(16) access_control;
      if private then
        size_enable    = __MPU_RASR_P[r]<15:0>;
        base_address   = __MPU_RBAR_P[r];
        access_control = __MPU_RASR_P[r]<31:16>;
      else
        size_enable    = __MPU_RASR_NP[r]<15:0>;
        base_address   = __MPU_RBAR_NP[r];
        access_control = __MPU_RASR_NP[r]<31:16>;
      if size_enable<0> == '1' then // MPU region enabled so perform checks
        lsbit = UInt(size_enable<5:1>) + 1;
        if HaveMainLineProfile( ) then
          if lsbit < 5 then UNPREDICTABLE;
          if (lsbit < 8) && (!IsZero(size_enable<15:8>)) then
UNPREDICTABLE;
        else
```

```
    if lsbit < 8 then UNPREDICTABLE;
  if lsbit == 32 || address<31:lsbit> == base address<31:lsbit> then
    subregion = UInt(address<lsbit-1:1sbit-3>);
    if size enable<subregion+8> == '0' then
      texcb         = access_control<5:3,1:0>;
      S             = access_control<2>;
      perms.ap      = access_control<10:8>;
      perms.xn      = access_control<12>;
      perms.region  = r<7:0>;
      perms.hit     = '1';
      attributes    = DefaultTEXDecode(texcb,S);
      hit           = TRUE;
  if address<31:29> == '111' then // enforce System space execute never
    perms.xn = '1';
  if !hit then // Access not allowed if no MPU match and use of default not
enabled
    perms.ap = '000';
  return (attributes, perms);
```

Figure 8:
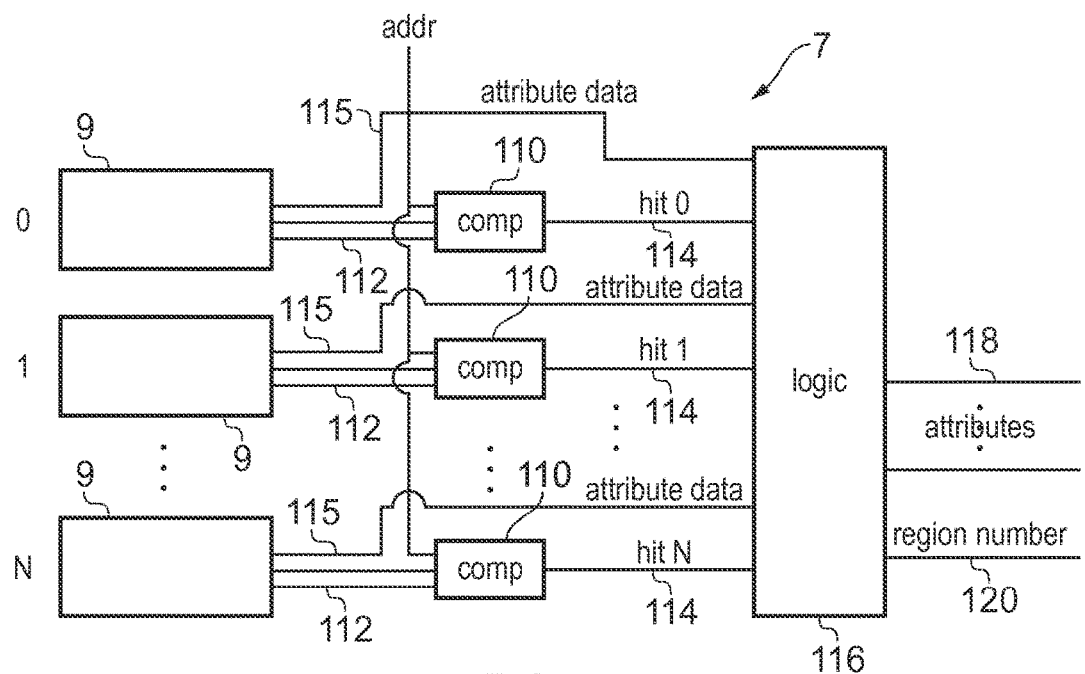
FIG. 8 illustrates an example of a memory attribute unit having logic for generating a region number identifying a region corresponding to a target address.

FIG. 8 shows an example of hardware of the memory attribute unit 7 (which may be the security protection unit 42 or one of the MPUs 50, 52). Each storage region 9 may be represented by a number of registers for storing the attribute data for the corresponding region. FIG. 8 shows an example in which the region number (used for the PREGION or MREGION fields) is not stored within the attribute data in the storage regions 9 of the memory attribute unit, but it is instead generated by the memory attribute unit 7. Hence, when an address is input to the memory attribute unit in response to the region identifying operation, then comparators 110 compare the input address with data 112 defining the memory address ranges corresponding to each region 9 and assert a hit signal 114 if the address is within the address range of the corresponding region 9. The memory attribute unit 7 has logic 116 which receives the hit signals 114 together with the attribute data 115 from storage regions 9 and outputs attributes 118 for the region for which a hit was detected. The functionality for looking up a target address and outputting attributes 118 would typically already be part of a memory attribute unit which does not use the present technique. The present technique extends the functionality of logic 116 to also generate and output a region number 120 based on which hit signal 114 is asserted.

In other embodiments the region number may be a value stored in the region 9 as part of the attribute data itself, and when there is a hit for the target address of the region identifying operation then the region number stored in the matching region 9 can be read out from the registers and output by the processing circuitry 4.

In general each memory attribute unit 7 may comprise a separate instance of the registers 9 for storing the attribute data. However, it is possible for different memory attribute units 7 to share some of the other circuitry such as the comparators 110 and control logic 116. For example, as typically only one of the secure MPU 50 and less secure MPU 52 would be active at a time, it is not necessary to duplicate the comparators 110 and control logic 116, and circuit area can be saved by sharing the comparators 110 and logic 116 between the two MPUs.

Figure 9A:
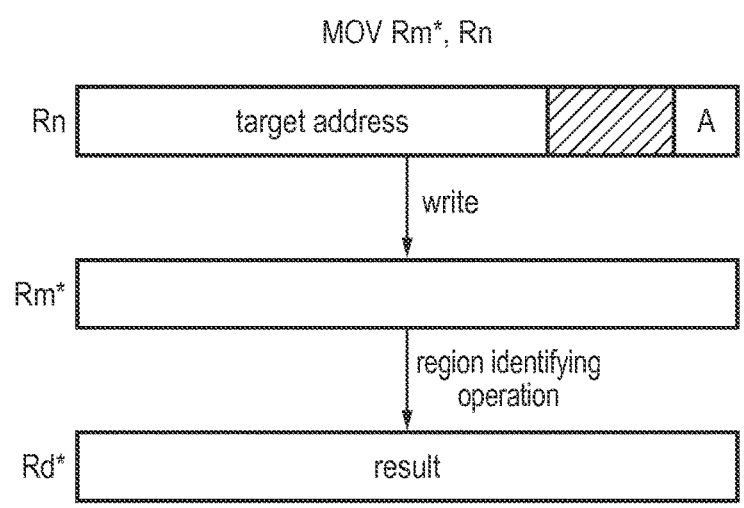
FIG. 9A shows an example of triggering the region identifying operation by writing a target address to predetermined register.

While FIG. 6 shows an example where a dedicated region identifying instruction TT is provided, in other examples the region identifying operation may be triggered by another type of instruction, such as general purpose instruction. For example, FIG. 9A shows a case where a general purpose move instruction MOV is provided for moving the contents of a source register Rn to a second register Rm*. A special register may be provided which, when written to, triggers the processing circuitry 4 to perform the region identifying operation for the address placed in the register. Hence, if the MOV instruction is executed with the special register as the second register Rm*, then the processing circuitry 4 may perform the region identifying operation and set a special destination register Rd* to the result value shown in FIG. 7. Another instruction can then obtain the region identifying values and other additional information from the destination register Rd*. As shown in FIG. 9A, the A flag can also be placed in the special register using the MOV instruction to control whether the secure MPU 50 or less secure MPU 52 is accessed in the same way as discussed for FIG. 7.

Figure 9B:
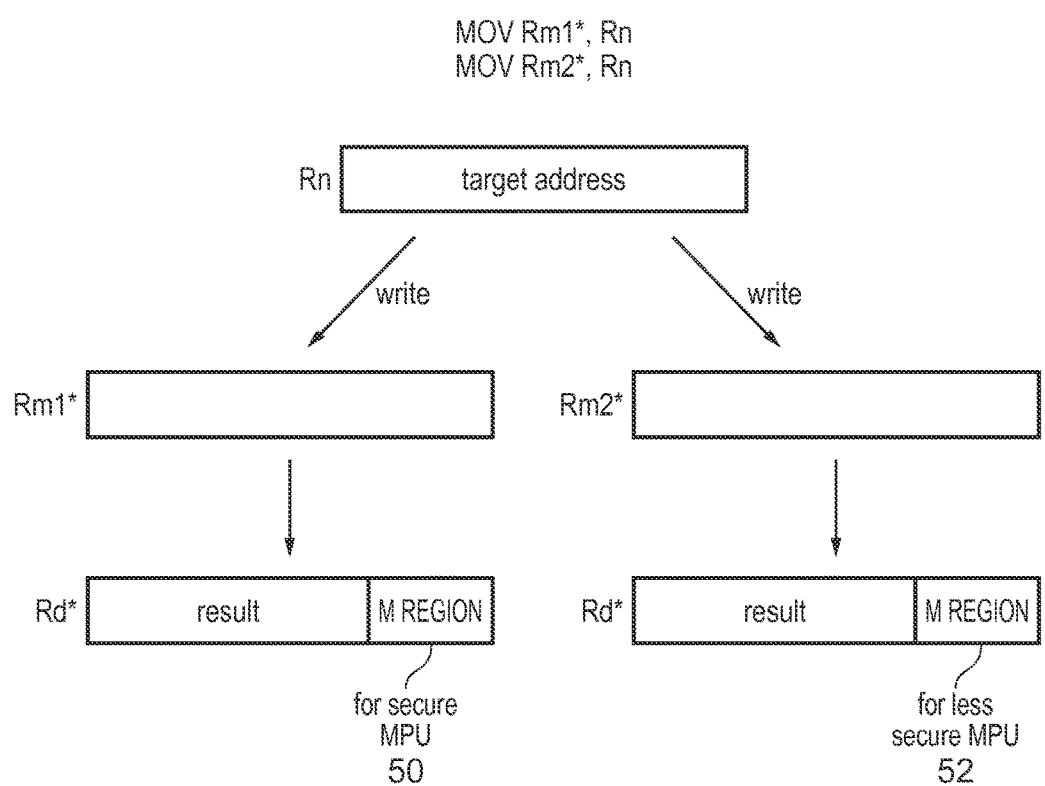
FIG. 9B shows an example of providing different predetermined registers for triggering a region identifying operation for memory attribute units in different domains.

Alternatively, the A flag may not be provided, and instead an embodiment can be provided as in FIG. 9B in which two different special registers Rm1*, Rm2* may be provided, one corresponding to the secure MPU and the other corresponding to the less secure MPU, so that by selecting which of these special registers is the destination register for the MOV instruction, the programmer can select which MPU is interrogated. Similarly, in the example of FIG. 6, instead of using the A flag, two separate instructions may be provided, one for interrogating the secure MPU 50 and one for interrogating the less secure MPU 52.

In some embodiments the registers Rm*, Rm1*, and Rm2* may be memory mapped, in such cases a store instruction would be used to write the value from the register Rn to the special registers Rm*, Rm1*, and Rm2*. The destination register Rd* may also be memory mapped, and a load instruction would be used to access the region identifying value.

Also, while FIGS. 9A and 9B show examples where the target address is the value written to the special register Rm*, Rm1* or Rm2* to trigger the processing apparatus 2 to perform the region identifying operation, in other examples the address need not be written to the special register. Instead, a different value may be written to the special register, and this triggers the processing circuitry 4 to read the address from another location and to perform the region identifying operation using that address.

Hence, the present technique allows a programmer to include an instruction in code to control the processing circuitry to obtain the region number of the storage region 9 in the security protection units 42 or MPU 50, 52 that matches a given target address. This can be useful in several situations as shown in the examples of FIGS. 10 to 13.

Figure 10:
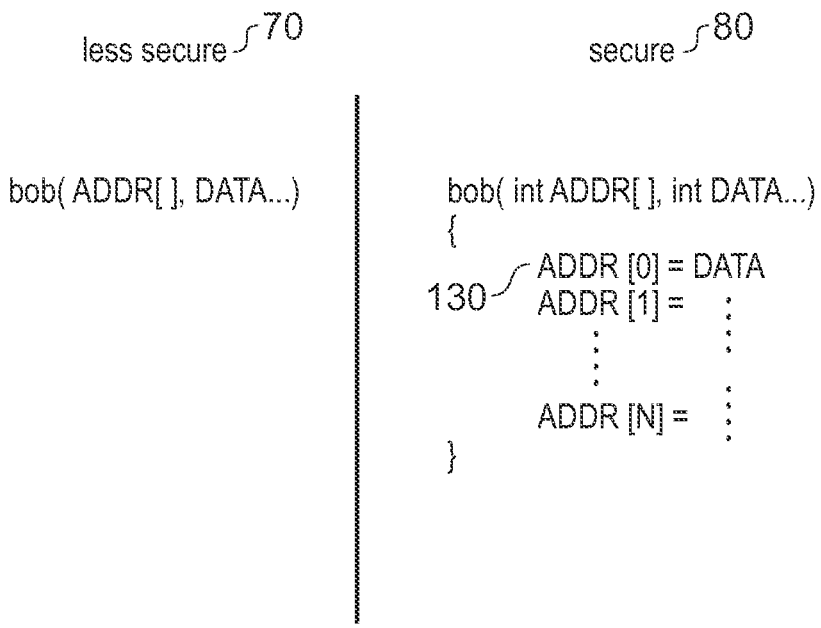
FIG. 10 shows an example of a function in a secure domain which uses addresses passed from the less secure domain.

FIG. 10 shows an example of a secure function bob( ) which is called from the less secure domain 70 by branching to a secure address. The function bob( ) uses a range of addresses ADDR[ ] specified by the code in the less secure domain 70. This type of function can be problematic because if the less secure code 70 can pass a secure address to the secure domain 80, then an operation which reads or writes to that address (for example operation 130) could inappropriately access or update secure data, since once in the secure domain 80 the access to another secure address would typically be allowed. To prevent this situation, the function bob( ) should be written to include a check of whether the addresses passed by the less secure domain are secure addresses or less secure addresses. However, if arrays are passed from the less secure domain, then bob( ) must perform check that the entire array is contained within less secure memory 46. This is because even if the start address of an array is located within less secure memory 46 then the array might extend into secure memory 44 (as shown in 152 in FIG. 11), possibly leading to a security violation if only the location of the start address is checked. Such a case could be detected if the secure function bob( ) checked both the start and end addresses of the array to be accessed. However this is not sufficient to ensure the security of the system as the array might completely span a secure memory address range, such that both the start and end addresses are located in less secure memory 46. An example of this case is illustrated in 160 in FIG. 11. Checking the attribute data in the security protection unit 42 for each address within the array individually can be slow and lead to increased power consumption and reduced performance.

Figure 11:
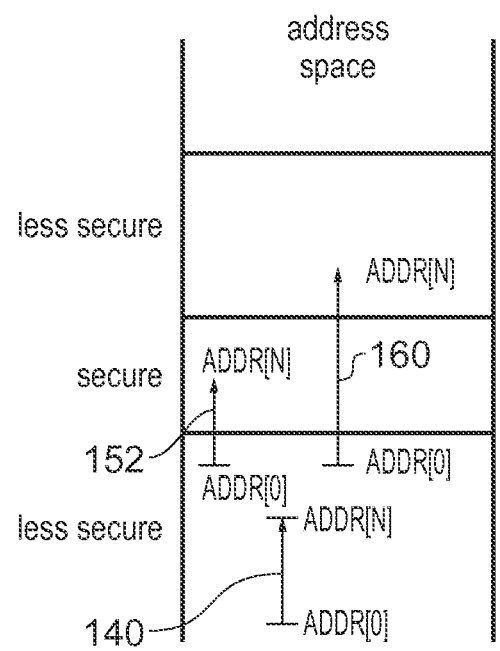
FIG. 11 shows an example of problems which may arise depending on which memory attribute regions are spanned by the addresses passed from the less secure domain.

The present technique recognises that using the region identifying operation discussed above, checking each address individually often becomes unnecessary, so that processing resources and power can be saved. As shown in FIG. 11, often the range of addresses 0 to N specified in the array ADDR[ ] may be entirely within the address range corresponding to a single storage region 9 of the memory attribute unit 7. For example, the addresses 140 shown in FIG. 11 are entirely within a less secure region of the address space represented by a single storage region 9 of the security protection unit 42. In this case, in a system that does not permit overlapping regions, if it can be determined that the start address and end address of the array of addresses relate to the same storage region 9, and that storage region is indicated as less secure, then it is not necessary to check the permissions of all the intervening addresses and the rest of the function bob( ) can proceed as normal. This saves a lot of processing. On the few occasions when the range of addresses spans the address ranges associated with multiple storage regions 9 (e.g. see examples 152, 160 of FIG. 11), then further checks may be necessary to determine whether the processing can proceed. In practice, most arrays would be within a single region as shown in example 140 and so the further checks need not be performed that often. Even if further checks are required, the region identifying operation is useful for identifying the point at which the addresses cross from the address range associated with one region to the address range associated with another, so that the number of individual addresses whose attributes need to be checked can be reduced.

Hence, as shown in the corresponding example of FIG. 12, function bob( ) can be modified to include the region identifying operation. When the less secure code calls the function bob( ), then there is a branch to the secure domain 80. A first pair of instructions 170 is executed to place the start and end addresses of the array ADDR[ ] into registers R1, R2. Two region identifying operations 180 are then performed to check the security protection region number (PREGION) for the addresses in registers R1, R2. At step 190, if the security protection unit 42 region number (bits 15:8) of registers R3, R4 are the same, and both region numbers are valid (bit 17), then this means that the start and end addresses of the array of addresses ADDR[ ] relate to a single storage region 9 of the memory attribute unit, and so if these addresses are less secure addresses (bit 22 of R3 is 0), then the entire array ADDR[ ] of addresses is safe because they all relate to less secure region of the address space. In this case then a branch instruction 200 branches to an address addX to perform the processing required by the function as in FIG. 10. On the other hand, if the start and end addresses relate to different storage regions or they relate to a secure region, then further checking is required at step 210 and if this check is failed then processing faulted or an error is signalled in some way. Hence, by using the region identifying operations 180 in this way, on many occasions the further checking 210 can be skipped to save a significant amount of processing.

The further checking 210 may be performed in different ways. For example, if it is found that the start and end addresses of the array relate to different storage regions 9 of the memory attribute unit 7 then the intervening addresses may be inspected to find where the boundary of the storage regions 9 is. For example an address half way between the start and end addresses may be checked first to see whether it relates to the same region 9 as one of the start and end addresses, and then further binary divisions of the address range may be performed until it is determine how many regions 9 correspond to the array of addresses ADDR[ ] and where the boundary between the different regions is. Alternatively in other embodiments the region number obtained from the region identifying operations 180 could be used to index into a data structure containing the start and end addresses for the regions, allowing the address of the adjoining region (ie the next region to be checked) to be obtained without the need to discover where the boundaries are using the binary division process. The attributes of one address per storage region 9 can then be checked to determine whether the continued processing of the function bob( ) is allowed. As shown in example 160 of FIG. 11 it is possible that the array ADDR[ ] could span multiple regions. If there are multiple regions then the attributes of each of those regions would need to indicate a less secure domain in order for the continued operation of the function to be allowed. The further checking can be relatively complex, but by using the region identifying operation it can be performed faster, and if possible omitted altogether.

While FIGS. 10 to 12 show an example of a function that crosses a boundary between the less secure domain 70 and the secure domain 80, in other examples a similar set of operations could be performed when crossing between the privileged and unprivileged states 90, 100, or when crossing between other modes having different security levels. Also while FIG. 12 shows example where the special region identifying instruction is used to implement the region identifying operation as step 180, in other examples the alternative approach of FIG. 9 using a write to a special register may be used for example.

Figure 13:
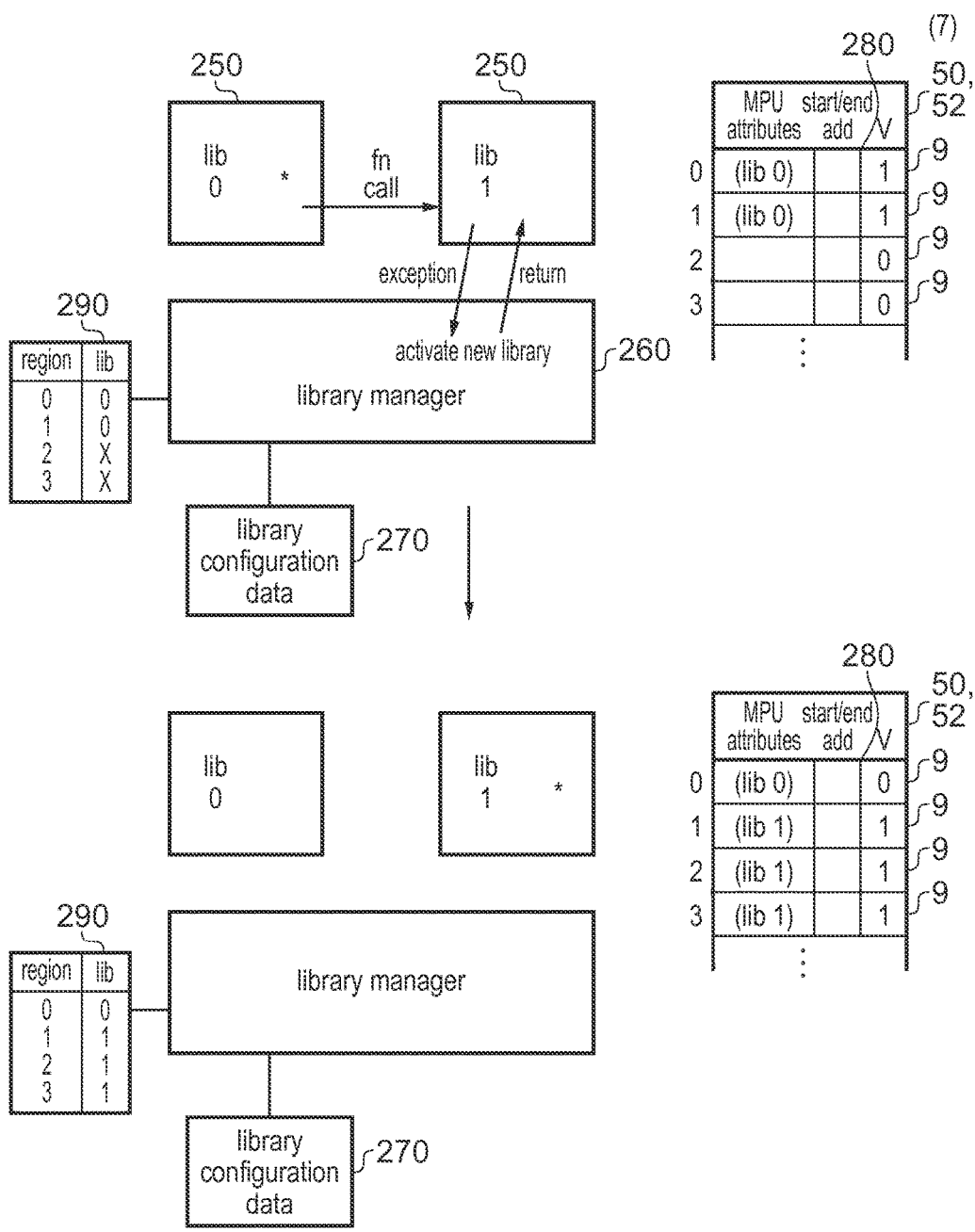
FIG. 13 shows an example where the region identifying operation can be used to speed up the activation of a new library.

FIG. 13 shows another situation in which the region identifying operation may be useful. The configuration of the MPU 50 or 52 may vary as different processes or context become active. An example of this is where there may be several different software libraries 250 which need to be kept separate from one another within the same domain or mode. For example within the secure domain 80 there may be different applications provided by mutually distrusting parties which each require the protection provided by the secure domain 80, but which must be prevented from accessing each other. Therefore, a library manager 260 may be provided which selects one of the libraries as an active library and sets the other libraries as inactive. For example, in FIG. 13 library 0 is active and library 1 is inactive. More details of this approach are described in the co-pending application GB 1310421.1 filed on 12 Jun. 2013 by ARM Limited of Cambridge, UK, the contents of which are entirely incorporated herein by reference. In this approach each library is associated with a different MPU configuration defining which ranges of the address space are accessible using that library. When a library is inactive, then its regions of the address space would be set as inaccessible and when a library is active then its regions are set as accessible. If there is a function call or branch to an address associated with an inactive library (either from the active library or from code operating in a different domain) then the MPU determines that this address is inaccessible and this triggers an access violation exception. The library manager 260 has a fault handler which can detect whether the access violation exception is triggered by an access to an inactive library, and if so then the fault handler switches the MPU configuration to activate the new library and deactivate the old library. Library configuration data 270 is used to determine what updates to the MPU should be made at this point.

Hence, as shown in the bottom part of FIG. 13, when the second library (library 1) has been activated and the first library (library 0) has been deactivated, then now the MPU 50, 52 will have a number of regions 1, 2, 3 setting access permissions for the newly active library (library 1). At this point, it is possible to evict data from regions 9 of the MPU 50, 52 that relate to the deactivated library (library 0). However, the MPU 50, 52 may have more storage regions 9 available than are necessary for storing the attribute data for the newly active library, library 1. As it is common for a recently deactivated library to be activated again relatively soon, then by retaining at least some of the attribute data relating to the deactivated library 0 in the MPU, but using a valid bit 280 to mark these regions as invalid, this can speed up processing when reactivating the library later on since it is not necessary to load as much data into the MPU.

However, one of the key tasks that must be performed when reactivating a library is translating the target address of a function call into the ID of the library to be activated next. Typically, the library main configuration data 270 would include software data structures which would have to be sequentially searched to find the mapping between the target address of a branch or function call to the required library and the library number. Searching such software structures can be costly in terms of performance and power consumption.

This problem can be addressed using the region identifying operation of the present technique. By using the region identifying operation, the MPU 50, 52 can be searched to find the region number of an invalid storage region corresponding to the target address of a function call to the inactive library. The region number can then be mapped to the library number more efficiently than is possible based on the target address alone. For example, a software table 290 as shown in FIG. 13 can be maintained by the library manager 260 to map region identifiers of storage regions 9 of the MPU to the library numbers. Such a table 290 would typically be much smaller than a table which maps addresses directly to library numbers. Therefore, the region identifying operation makes the updating of the MPU more efficient. In some examples, the software 290 shown in FIG. 13 may be part of the library configuration data 270. Also, in some cases the mapping of the region number to the library number may be performed without the software table 290, for example by storing an indication of the library number in the attribute data of the matching region itself.

Figure 14:
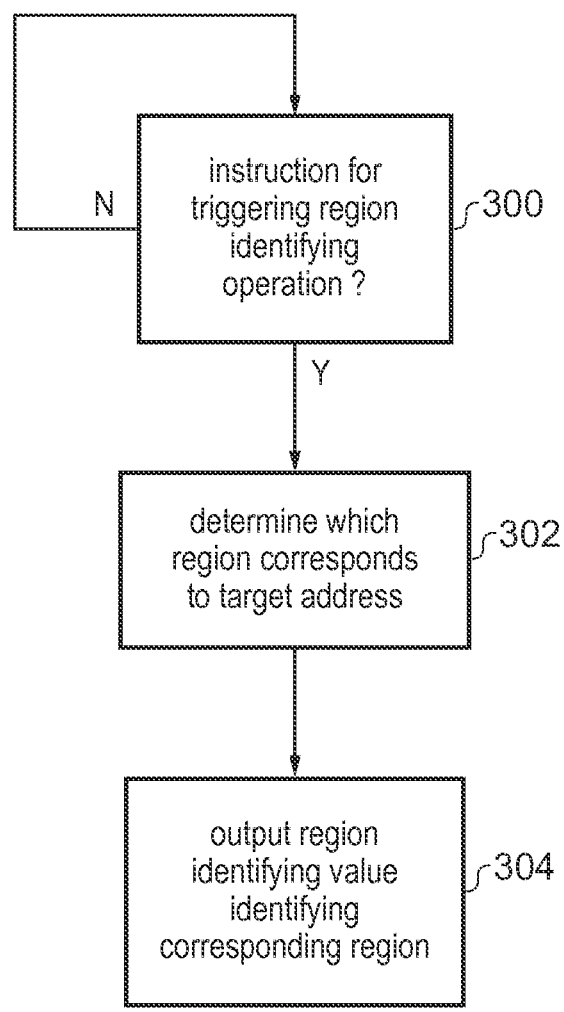
FIG. 14 is a flow diagram illustrating a method of performing the region identifying operation.

FIG. 14 shows a flow diagram representing a method of processing data. At step 300, the decode stage 12 of the processing circuitry 4 detects whether there is an instruction for triggering a region identifying operation. This could be the region identifying instruction shown in FIG. 6 or another instruction which triggers the region identifying operation in some other way as in the example FIG. 9. If there is such an instruction then at step 302 it is determined which region corresponds to the target address and at step 304 the region identifying value identifying the corresponding region is output, to make the region identifying value available to at least some software executed by the data processing apparatus 2.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit as defined by the appended claims.

The invention claimed is:

1. A data processing apparatus comprising:
    processing circuitry configured to perform data processing;
    a memory attribute unit comprising a plurality of storage regions, each storage region configured to store attribute data for controlling access to a corresponding memory address range by the processing circuitry; and
    wherein in response to a target memory address, the processing circuitry is configured to perform a region identifying operation to determine which of the plurality of storage regions of the memory attribute unit is a matching storage region for which the corresponding memory address range includes said target memory address, and to output a region identifying value identifying which of said plurality of storage regions of the memory attribute unit is said matching storage region for the target memory address, wherein the target memory address is a physical address and the region identifying value is made available to at least some software executed by the data processing apparatus.

2. The data processing apparatus according to claim 1, wherein the processing circuitry is configured to perform said region identifying operation in response to a region identifying instruction specifying said target memory address.

3. The data processing apparatus according to claim 1, wherein the processing circuitry is configured to perform said region identifying operation in response to an instruction writing a value to a predetermined register.

4. The data processing apparatus according to claim 3, wherein the value written to said predetermined register is said target memory address.

5. The data processing apparatus according to claim 1, wherein the processing circuitry is configured to output an invalid region identifying value if:
(a) the memory attribute unit is disabled; or
(b) the target memory address does not correspond to any of the plurality of regions; or
(c) the target memory address corresponds to two or more of the plurality of regions; or
(d) the target memory address corresponds to two or more of the plurality of regions which are enabled; or
(e) the target memory address does not correspond to any of the plurality of regions which are enabled; or
(f) the region identifying operation is performed when the processing circuitry is in a mode of operation having insufficient security privileges to determine the region identifying value.

6. The data processing apparatus according to claim 5, wherein the invalid region identifying value comprises a predetermined value which does not represent one of said plurality of storage regions.

7. The data processing apparatus according to claim 5, wherein the invalid region identifying value comprises a region identifying value associated with a validity flag indicating whether the region identifying value is valid.

8. The data processing apparatus according to claim 1, wherein in the region identifying operation, the processing circuitry is configured to output additional information comprising at least one of:
(a) at least some of the attribute data stored in the matching storage region;
(b) information derived from at least some of the attribute data stored in the matching storage region;
(c) an indication of a security state associated with the memory address range for the matching storage region;
(d) a value corresponding to the start address of the memory address range for the matching storage region;
(e) a value corresponding to the end address of the memory address range for the matching storage region; and
(f) a value corresponding to the size of the memory address range for the matching storage region.

9. The data processing apparatus according to claim 1, wherein in the region identifying operation, the processing circuitry is configured to write the region identifying value to at least a portion of a destination register.

10. The data processing apparatus according to claim 1, wherein the region identifying value comprises a region number of the matching storage region.

11. The data processing apparatus according to claim 10, wherein in the region identifying operation, the processing circuitry is configured to control the memory attribute unit to generate said region number based on which of said plurality of storage regions is the matching storage region.

12. The data processing apparatus according to claim 10, wherein each storage region of the memory attribute unit is configured to store the region number of the storage region; and
in the region identifying operation, the processing circuitry is configured to control the memory attribute unit to output the region number from the matching storage region.

13. The data processing apparatus according to claim 1, wherein the memory attribute unit is a first memory attribute unit comprising a plurality of first storage regions, each first storage region configured to store first attribute data for controlling access to a corresponding first memory address range;
the data processing apparatus comprises a second memory attribute unit comprising a plurality of second storage regions, each second storage region configured to store second attribute data for controlling access to a corresponding second memory address range; and
in the region identifying operation, the processing circuitry is configured to output a first region identifying value for identifying which of said plurality of first storage regions is a corresponding first storage region indicated by said first memory attribute unit as corresponding to a first memory address range including said target memory address, and a second region identifying value for identifying which of said plurality of second storage regions is a corresponding second storage region indicated by said second memory attribute unit as corresponding to a second memory address range including said target memory address.

14. The data processing apparatus according to claim 13, wherein in the region identifying operation, the processing circuitry is configured to output a combined attribute parameter using at least part of the first attribute data stored in the corresponding first storage region and at least part of the second attribute data stored in the corresponding second storage region.

15. The data processing apparatus according to claim 1, wherein the processing circuitry has a plurality of domains of operation including a secure domain and a less secure domain, and when the processing circuitry is operating in the secure domain, the processing circuitry has access to at least some data which is inaccessible when the processing circuitry is operating in the less secure domain.

16. The data processing apparatus according to claim 15, wherein the memory attribute unit comprises a security protection unit and the processing circuitry is configured to determine which of the plurality of domains is associated with a specified memory address using the attribute data of the security protection unit; and
when the processing circuitry is operating in the less secure domain, a memory address associated with the secure domain is inaccessible to the processing circuitry.

17. The data processing apparatus according to claim 15, wherein if the region identifying operation is executed when the processing circuitry is operating in the less secure domain, then the processing circuitry is configured to inhibit outputting of the region identifying value identifying the matching storage region of the memory attribute unit.

18. The data processing apparatus according to claim 15, further comprising:
(i) a secure memory protection unit configured to store attribute data for controlling access to memory address ranges by the processing circuitry when operating in the secure domain; and
(ii) a less secure memory protection unit configured to store attribute data for controlling access to memory address ranges by the processing circuitry when operating in the less secure domain;
wherein the secure memory protection unit is inaccessible to the processing circuitry when operating in the less secure domain.

19. The data processing apparatus according to claim 18, wherein the region identifying operation selects a selected memory protection unit of the secure memory protection unit and the less secure memory protection unit; and in the region identifying operation, the processing circuitry is configured to output a region identifying value identifying which of said plurality of storage regions is indicated by the selected memory protection unit as corresponding to a memory address range including said target memory address.

20. The data processing apparatus according to claim 19, wherein if the region identifying operation is performed when the processing operation is operating in the less secure domain, and the region identifying operation selects the secure memory protection unit as the selected memory protection unit, then the processing circuitry is configured to inhibit outputting of the region identifying value identifying the matching storage region of the secure memory protection unit.

21. A data processing apparatus comprising:
processing means for performing data processing; and
memory attribute storage means comprising a plurality of storage region means for storing attribute data for controlling access to a corresponding memory address range by the processing means;
wherein in response to a target memory address, the processing means is configured to perform a region identifying operation to determine which of the plurality of storage region means of the memory attribute storage means is a matching storage region means for which the corresponding memory address range includes said target memory address, and to output a region identifying value identifying which of said plurality of storage region means of the memory attribute storage means is said matching storage region means for said target memory address, wherein the target memory address is a physical address and the region identifying value is made available to at least some software executed by the data processing apparatus.

22. A data processing method for a data processing apparatus comprising a memory attribute unit comprising a plurality of storage regions, each storage region configured to store attribute data for controlling access to a corresponding memory address range by processing circuitry; the method comprising:
in response to a target memory address, performing a region identifying operation;
the region identifying operation comprising:
determining which of said plurality of storage regions of the memory attribute unit is a matching storage region for which the corresponding memory address range includes said target memory address; and
outputting a region identifying value identifying which of said plurality of storage regions of the memory attribute unit is said matching storage region, wherein the target memory address is a physical address and the region identifying value is made available to at least some software executed by the data processing apparatus.

23. The data processing method according to claim 22, wherein the processing circuitry has a plurality of domains of operation including a secure domain and a less secure domain, and when the processing circuitry is operating in the secure domain, the processing circuitry has access to at least some data which is inaccessible when the processing circuitry is operating in the less secure domain; and
the region identifying operation is performed as part of a function executed in the secure domain using one or more memory addresses set by code executing in the less secure domain, wherein the target memory address for the region identifying operation comprises one of said one or more memory addresses.

* * * * *